(12) United States Patent
Koga et al.

(10) Patent No.: US 10,174,722 B2
(45) Date of Patent: Jan. 8, 2019

(54) FUEL VAPOR RECOVERING STRUCTURE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Yusuke Koga, Tokyo (JP); Katsuya Nakashima, Tokyo (JP); Satoshi Oikawa, Okazaki (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-Shi (JP)

( * ) Notice: Subject to any disclaimer, the term of this patent is extended or adjusted under 35 U.S.C. 154(b) by 0 days.

(21) Appl. No.: 15/427,742

(22) Filed: Feb. 8, 2017

(65) Prior Publication Data

US 2017/0226966 A1   Aug. 10, 2017

(30) Foreign Application Priority Data

Feb. 9, 2016   (JP) .................................. 2016-022893

(51) Int. Cl.
| | |
|---|---|
| *F02M 25/08* | (2006.01) |
| *B01D 46/00* | (2006.01) |
| *B01D 53/04* | (2006.01) |
| *F02M 35/024* | (2006.01) |
| *B60K 15/035* | (2006.01) |

(52) U.S. Cl.
CPC ....... *F02M 25/089* (2013.01); *B01D 46/0036* (2013.01); *B01D 53/0415* (2013.01); *B60K 15/03504* (2013.01); *F02M 25/0872* (2013.01); *F02M 35/02416* (2013.01); *B01D 2253/102* (2013.01); *B01D 2259/4516* (2013.01); *B60K 2015/03514* (2013.01); *B60K 2015/03523* (2013.01); *B60K 2015/03528* (2013.01); *B60K 2015/03542* (2013.01)

(58) Field of Classification Search
CPC ........... B60K 2015/03514; B60K 2015/03523; B60K 2015/03528; B60K 2015/03542; F02M 25/0854; F02M 25/0872; F02M 25/089
USPC .................................................. 123/518, 519
See application file for complete search history.

(56) References Cited

U.S. PATENT DOCUMENTS

| | | | | |
|---|---|---|---|---|
| 4,787,643 A | * | 11/1988 | Shirata ............. | B60K 15/03504 123/519 |
| 4,793,839 A | * | 12/1988 | Hayashida ....... | B60K 15/03504 123/519 |

(Continued)

FOREIGN PATENT DOCUMENTS

JP           3343572 B2      11/2002

*Primary Examiner* — Erick Solis
(74) *Attorney, Agent, or Firm* — Birch, Stewart, Kolasch & Birch, LLP (57) ABSTRACT

A fuel vapor recovering structure for a vehicle, the vehicle having a side member extending in a longitudinal direction of the vehicle, and a cross member extending along a vehicle width direction, includes: a canister attached to the side member for absorbing a fuel evaporation gas in a fuel tank of the vehicle; and an atmosphere communicating pipe having a first end connected to the canister, and a second end opened to the atmosphere and inserted in the cross member.

9 Claims, 7 Drawing Sheets

(56) References Cited

U.S. PATENT DOCUMENTS

| | | | | |
|---|---|---|---|---|
| 4,805,581 | A | * | 2/1989 | Yamada ............ B60K 15/03504 123/519 |
| 5,687,697 | A | * | 11/1997 | Ishikawa .......... B60K 15/03504 123/520 |
| 5,868,428 | A | * | 2/1999 | Ishikawa .......... B60K 15/03504 123/519 |
| 6,105,708 | A | | 8/2000 | Amano et al. |
| 2008/0271717 | A1 | * | 11/2008 | Yamamoto ........... F01M 13/022 123/519 |
| 2009/0159055 | A1 | * | 6/2009 | Ohhira ............. B60K 15/03504 123/519 |
| 2010/0032989 | A1 | * | 2/2010 | Ohara ................. B60K 15/035 296/204 |

* cited by examiner

FUEL VAPOR RECOVERING STRUCTURE

CROSS-REFERENCE TO RELATED APPLICATION(S)

This application is based upon and claims the benefit of priority from prior Japanese patent application No. 2016-022893, filed on Feb. 9, 2016, the entire contents of which are incorporated herein by reference.

BACKGROUND

The present invention relates to a fuel vapor recovering structure for a vehicle.

A vehicle using an internal-combustion engine as a driving source is provided with a structure (fuel vapor recovering structure) for recovering a fuel evaporation gas (fuel vapor) evaporating from a fuel held in a fuel tank. The fuel vapor recovering structure is provided with a canister that prevents release of the fuel evaporation gas to the atmosphere by adsorbing, by a fuel adsorbent.

The fuel vapor recovering structure is provided with an atmosphere communicating pipe through which outside air is introduced into the canister, and the fuel having been adsorbed by the fuel adsorbent is supplied, for combustion, to the engine together with the outside air introduced through the atmosphere communicating pipe. An end of the atmosphere communicating pipe is opened to the atmosphere.

Japanese Patent No. 3343572 discloses a related art in which a canister is attached to a fuel tank and an end of an atmosphere communicating pipe is attached to a portion close to one end in a vehicle width direction of a cross member.

In the above-described related art, however, since the canister is attached to the fuel tank, there is room for improvement in improving the durability of the canister by increasing the attaching strength of the canister.

Besides, since the end of the atmosphere communicating pipe is attached to the portion closer to the end in the vehicle width direction, there is room for improvement in inhibiting water or mud from entering the canister through the atmosphere communicating pipe and inhibiting odor of the fuel leaking from the end of the atmosphere communicating pipe from entering a vehicle cabin.

SUMMARY

An object of the present invention is to provide a fuel vapor recovering structure for a vehicle, which is advantageous in improving durability of the canister, inhibiting water or mud from entering the atmosphere communicating pipe and inhibiting odor of a fuel from entering a vehicle cabin.

In order to achieve the above object, according to the present invention, there is provided a fuel vapor recovering structure for a vehicle, the vehicle having a side member extending in a longitudinal direction of the vehicle, and a cross member extending along a vehicle width direction, the fuel vapor recovering structure comprising: a canister attached to the side member for absorbing a fuel evaporation gas in a fuel tank of the vehicle; and an atmosphere communicating pipe having a first end connected to the canister, and a second end opened to the atmosphere and inserted in the cross member.

DETAILED DESCRIPTION OF EXEMPLARY EMBODIMENTS

Now, a preferred embodiment of the present invention will be described with reference to the accompanying drawings.

Although the present embodiment is described on the assumption that a vehicle includes an internal-combustion engine alone, it goes without saying that the present invention is applicable to a vehicle including an internal-combustion engine and an electric motor, namely, a hybrid vehicle or a plug-in hybrid vehicle.

It is noted that a lateral direction (i.e. width direction) herein is defined in a state of facing frontward of the vehicle. Besides, in the drawings referred to below, an arrow FR indicates a frontward direction of the vehicle, an arrow OUT indicates an outward direction along the vehicle width direction and an arrow DOWN indicates a downward direction of the vehicle.

Figure 1:
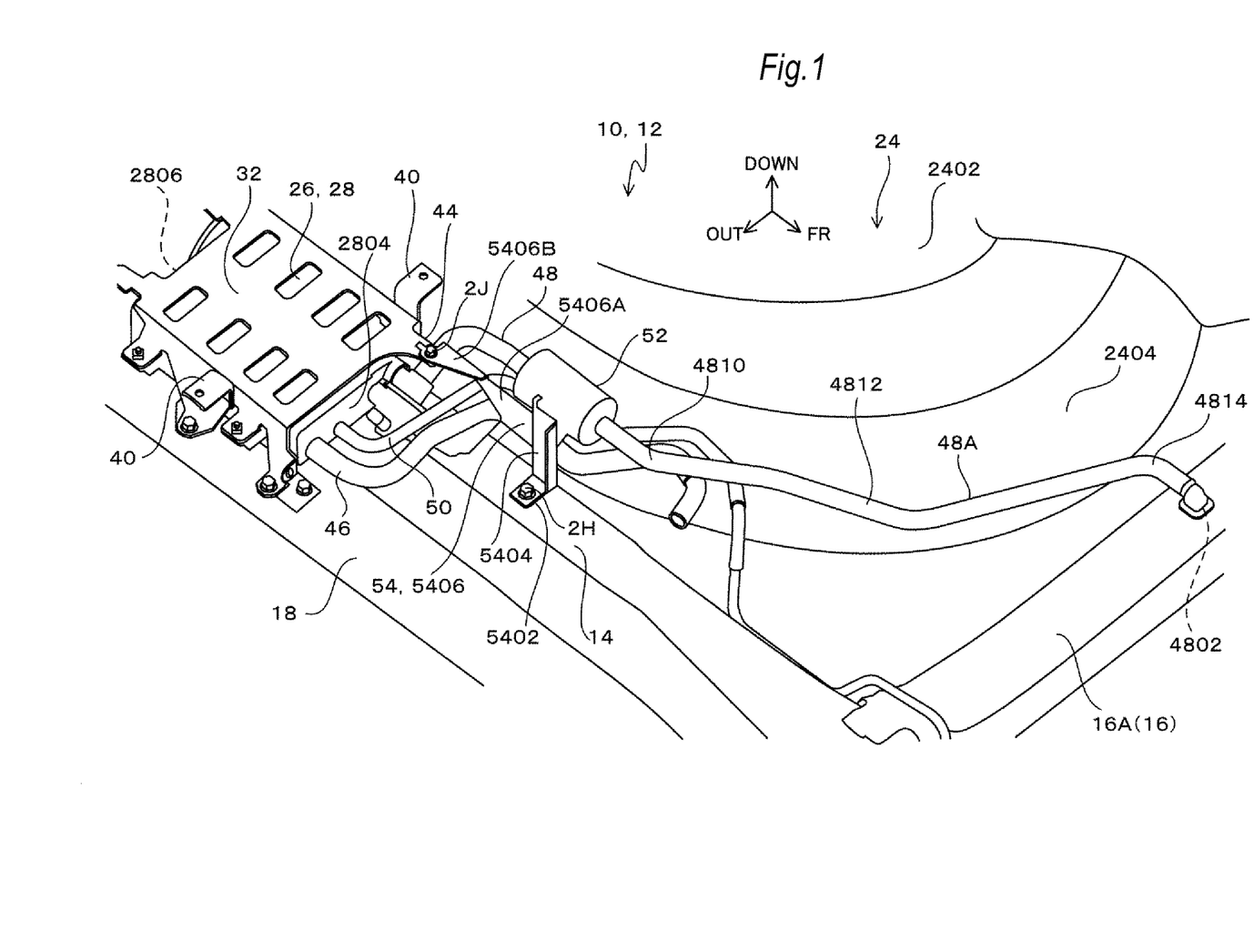
FIG. 1 is a perspective view of a rear lower part of a vehicle according to an embodiment viewed from a diagonally forward direction of the vehicle.
Figure 2:
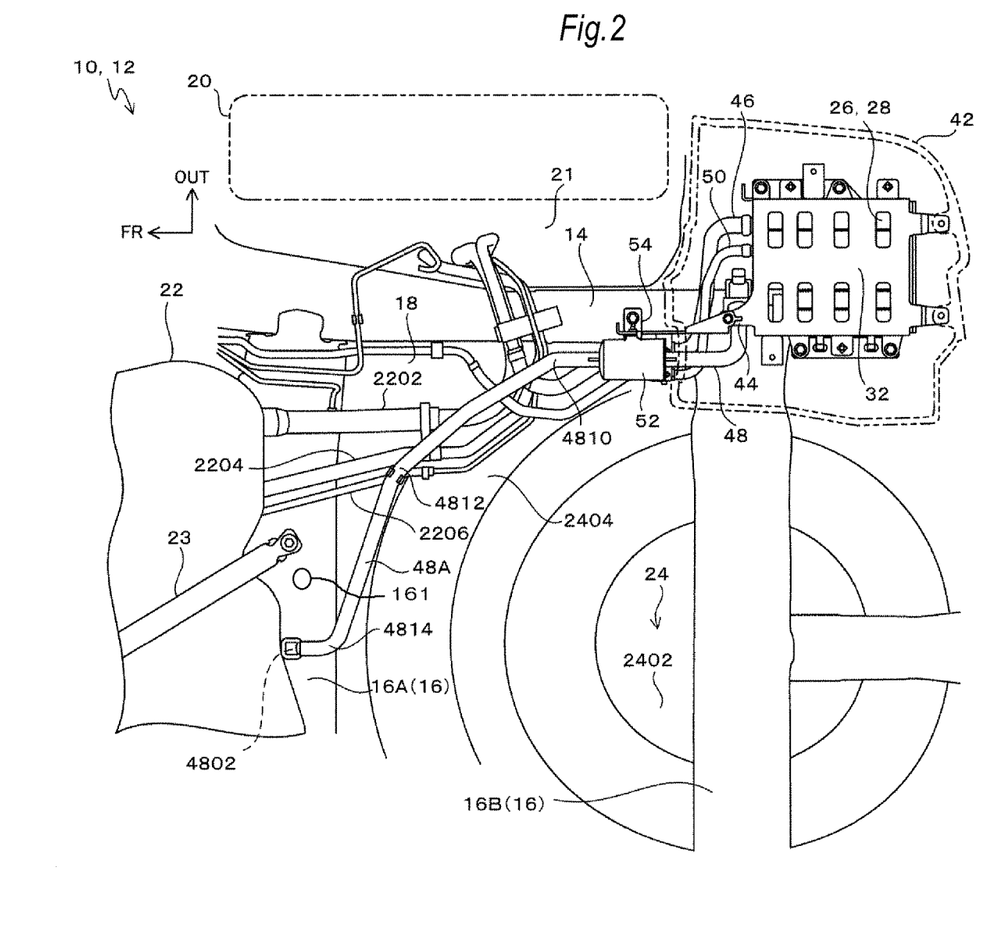
FIG. 2 is a bottom view of a rear part of the vehicle according to the embodiment viewed from below the vehicle.
Figure 3:
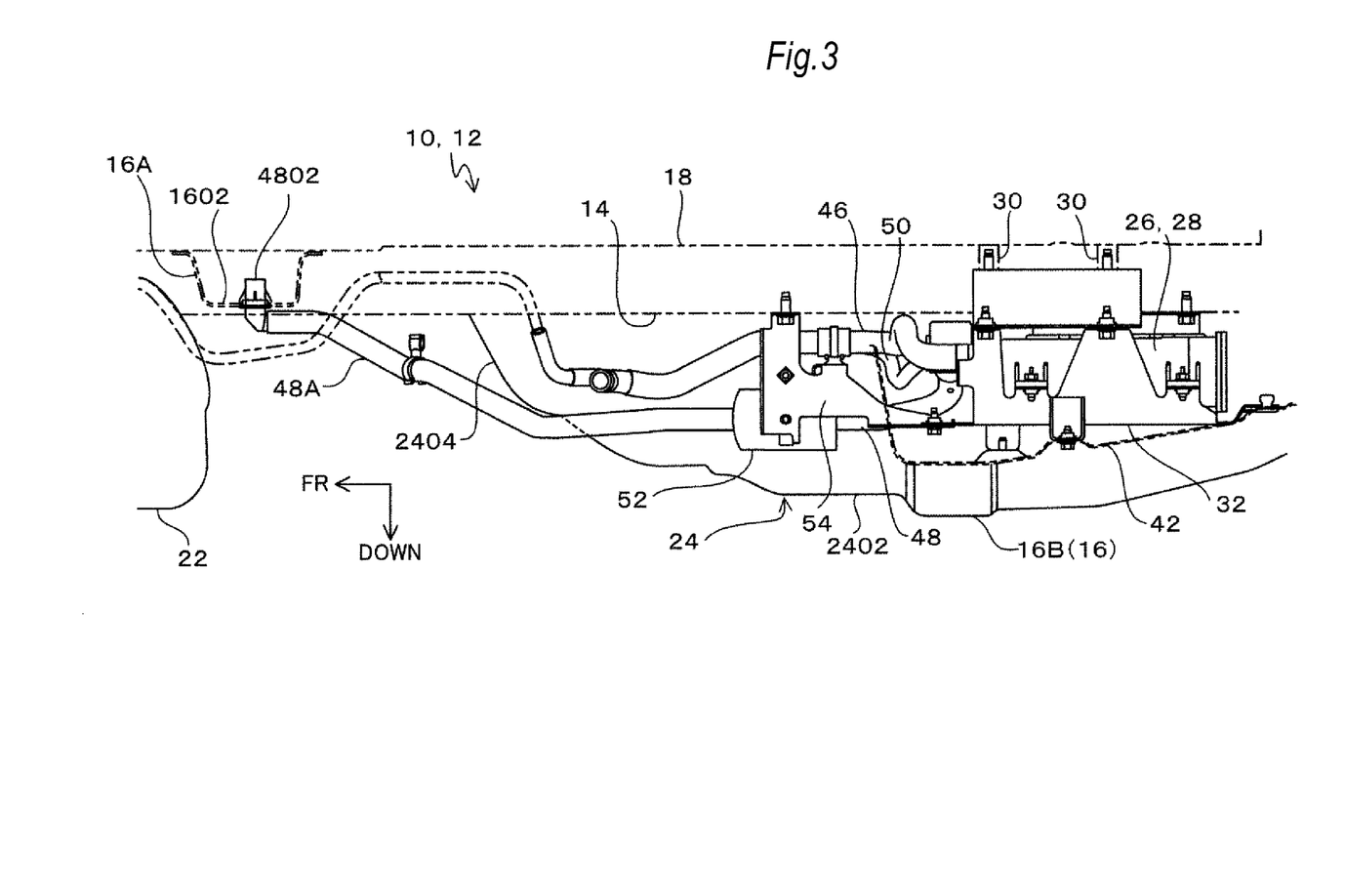
FIG. 3 is a side view of a canister and a portion in front thereof viewed from a right side of the vehicle.

As illustrated in FIGS. 1 to 3, a vehicle 10 is provided with a body 12 including a pair of side members 14, a plurality of cross members 16 and a floor panel 18, and an engine not illustrated is mounted in a front part of the body 12.

The pair of side members 14 spaced from each other in the vehicle width direction of the vehicle 10 extend in a vehicle longitudinal direction.

The plural cross members 16 are disposed at intervals in the longitudinal direction of the vehicle 10, and extend in the vehicle width direction to be joined by welding to the pair of side members 14.

In FIGS. 1 to 3, the left side member 14 is illustrated, and in FIGS. 1 and 2, the cross members 16A and 16B respectively disposed in middle and rear portions in the vehicle longitudinal direction are illustrated. In other words, the cross member 16A that is disposed forward out of the two cross members 16A and 16B is disposed in a portion inside a rear wheel 20 in the vehicle width direction and slightly forward the rear wheel 20, and the cross member 16B that is disposed backward is disposed in a portion in the rear of the rear wheel 20.

The floor panel 18 is disposed in a lower portion of the body 12 and is made of a steel plate. Both ends in the vehicle width direction of the floor panel 18 are joined by welding to upper surfaces of the pair of side members 14. The side members 14 and the cross members 16 are made of hot-shaped steel plates formed into a generally elongate, hollow shell structure.

A fuel tank 22 is a member supplying a fuel stored therein, and is disposed below the floor panel 18.

The fuel tank 22 is in a narrow rectangular shape in a plan view, is disposed in the center in the vehicle width direction with its lengthwise direction aligned with the vehicle width direction, and is attached via a stay 23 to the cross member 16A and another cross member not illustrated but disposed forward of the cross member 16A.

Incidentally, in FIG. 2, a reference sign 2202 denotes an inlet pipe connecting a fuel filler opening not illustrated to the fuel tank 22, a reference sign 2204 denotes an air vent pipe of the fuel tank 22, and a reference sign 2206 denotes a pipe for adjusting an internal pressure of the fuel tank 22.

A spare tire storage 24 is provided integrally with the floor panel 18 in a position on the floor panel 18 inside the pair of side members 14 and above the cross member 16B positioned most backward.

The spare tire storage 24 includes a circular bottom wall 2402 in a shape projecting downward and disposed in a lower position than the side members 14, and a circumferential wall 2404 rising from the circumference of the bottom wall 2402, and a space for storing a spare tire is formed above the bottom wall 2402 and inside the circumferential wall 2404.

A fuel vapor recovering structure for a vehicle of the present embodiment includes a canister 26, a canister bracket 32, an under cover 42, a vapor pipe 46, an atmosphere communicating pipe 48, a purge pipe 50, an air filter 52 and an air filter bracket 54.

The canister 26 adsorbs a fuel evaporation gas evaporating from the fuel held in the fuel tank 22 as well as introduces the adsorbed fuel evaporation gas to an intake system of the engine, and is disposed behind the rear wheel 20 and outside the spare tire storage 24 in the vehicle width direction.

As illustrated in FIGS. 1 to 6, the canister 26 includes a case 28 housing a fuel adsorbent made of activated carbon or the like.

Figure 6:
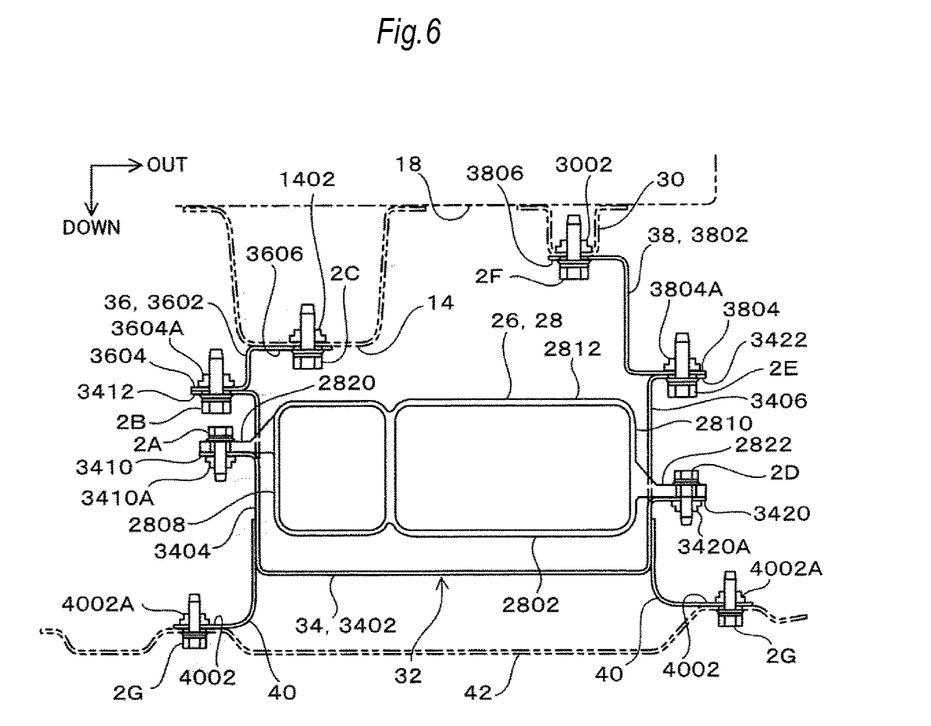
FIG. 6 is a cross-sectional view of a portion around the canister taken on a plane passing in a vehicle width direction and a vehicle vertical direction.

As illustrated in FIG. 6, the case 28 includes a bottom surface 2802 in the shape of a rectangle in a plan view, four side surfaces rising from the four sides of the bottom surface 2802, and a top surface 2812 connecting the side surfaces and opposing the bottom surface 2802, and is in the shape of a flat rectangular parallelepiped.

The four side surfaces of the case 28 include a front surface 2804 facing forward of the vehicle and a rear surface 2806 facing backward of the vehicle as illustrated in FIG. 1, and an inside side surface 2808 facing inward in the vehicle width direction and an outside side surface 2810 facing outward in the vehicle width direction as illustrated in FIG. 6.

Figure 4:
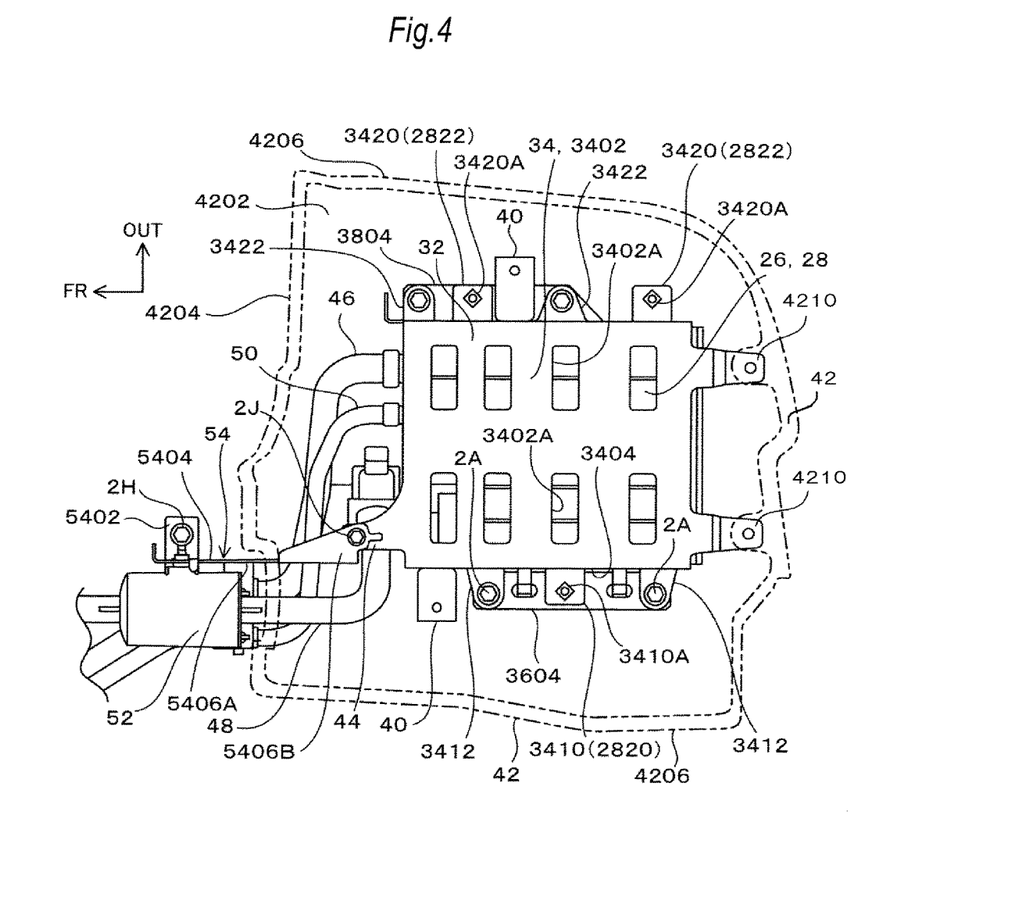
FIG. 4 is a bottom view of the canister and a surrounding portion viewed from below the vehicle.

Besides, as illustrated in FIGS. 4 and 6, an inside attaching portion 2820 is provided to project from a longitudinal center on the inside side surface 2080 of the case 28, and two outside attaching portions 2822 are asymmetrically provided to project from positions spaced from each other in the longitudinal direction and below the inside attaching portion 2820. The outside of the canister 26 is covered by a rear bumper not illustrated and hence is protected, but there is a possibility that the inside of the canister 26 may be damaged by a stone or the like because there is a gap between the under cover 42 and the spare tire storage 24 as described later, and therefore, the outside attaching portions 2822 are disposed in higher positions so that an inside side portion 3404 of the canister bracket 32 described later can be disposed in a position as high as possible, and thus, the canister can be more sufficiently protected. On the other hand, the outside of the canister 26 is protected by the rear bumper and the under cover 42, and hence an outside side portion 3406 of the canister bracket 32 is disposed in a position as low as possible so that the weight and the cost of the entire canister bracket 32 can be reduced. A bolt through-hole is formed through each of the attaching portions 2820 and 2822.

Figure 5:
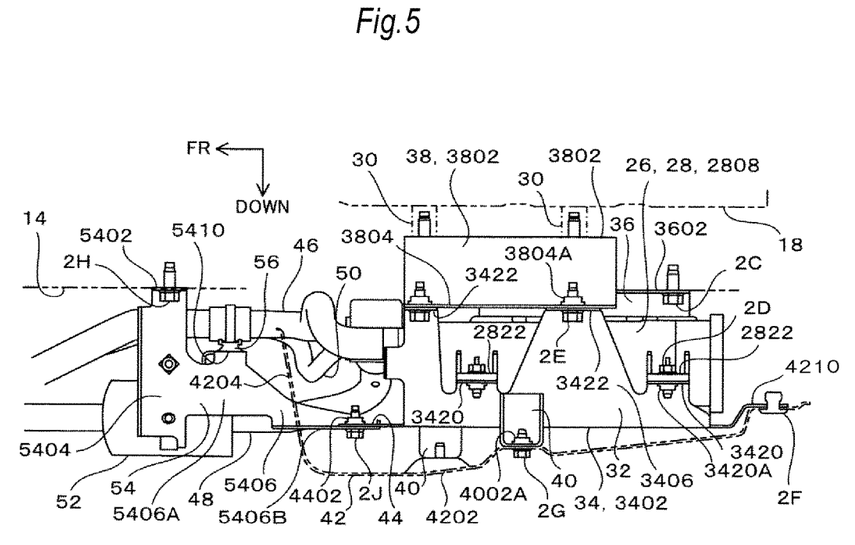
FIG. 5 is an enlarged side view of the canister and the portion in front thereof viewed from the right side of the vehicle.

As illustrated in FIGS. 5 and 6, the side member 14 is positioned above an end inside in the vehicle width direction of the case 28, and a leg 30 provided on the floor panel 18 is positioned above an end outside in the vehicle width direction of the case 28.

The canister bracket 32 has the case 28 attached to the side member 14 and the leg 30, and in other words, the canister bracket 32 has the case 28 attached to the body 12. The canister bracket 32 is made from a material having sufficient rigidity such as a metal or the like.

As illustrated in FIG. 6, the canister bracket 32 is configured by including a lower bracket 34, an upper inside bracket 36 and an upper outside bracket 38.

The lower bracket 34 includes a bottom portion 3402 positioned below the bottom surface 2802 of the case 28 to cover the bottom surface 2802, the inside side portion 3404 positioned inside the inside side surface 2808 of the case 28 in the vehicle width direction, and an outside side portion 3406 positioned outside the outside side surface 2810 of the case 28 in the vehicle width direction, and the case 28, the bottom portion 3402 and both the side portions 3404 and 3406 are disposed with their peripherals spaced from one another by prescribed distances. Even if water or mud enters, it runs down without accumulating for a long period of time.

As illustrated in FIG. 4, a plurality of holes 3402A are provided in the bottom portion 3402, so as to reduce the weight of the canister bracket 32. Besides, the plural holes 3402A also work as loopholes for mud and water having entered.

As illustrated in FIGS. 4 and 6, an inside middle flange 3410 is provided to project, inward in the vehicle width direction, from a middle of the inside side portion 3404 in the longitudinal direction of the vehicle 10, a bolt through-hole is formed in a tip of the inside middle flange 3410, and a nut 3410A is welded with its shaft center aligned with that of the bolt through-hole.

The inside attaching portion 2820 of the case 28 is overlaid from above on the inside middle flange 3410, so as to be attached to the inside middle flange 3410 with a bolt 2A inserted through the bolt through-hole and screwed into the nut 3410A.

Inside upper flanges 3412 are provided to project inward in the vehicle width direction respectively from two positions above the inside middle flange 3410 and spaced, in the longitudinal direction of the vehicle 10, from each other on the inside side portion 3404, and a bolt through-hole is formed in a tip of each of these inside upper flanges 3412.

As illustrated in FIG. 6, the upper inside bracket 36 includes a body plate portion 3602 extending in the longitudinal direction of the vehicle 10, two inside lower flanges 3604 provided to project, inward in the vehicle width direction, respectively from lower positions of the body plate portion 3602 spaced from each other in the longitudinal direction of the vehicle 10, and two inside upper flanges 3606 are provided to project, outward in the vehicle width direction, respectively from upper positions of the body plate portion 3602 spaced from each other in the longitudinal direction of the vehicle 10.

A bolt through-hole is formed in each of the inside lower flanges 3604, and a nut 3604A is welded with its shaft center aligned with that of the bolt through-hole.

The two inside lower flanges 3604 are respectively overlaid on the two inside upper flanges 3412, so as to be fastened with bolts 2B inserted into the bolt through-holes and screwed into the nuts 3604A.

The two inside upper flanges 3606 are overlaid on a lower surface of the side member 14, and bolts 2C are inserted through the bolt through-holes and other bolt through-holes formed in the side member 14, so as to be fastened with nuts 1402 welded inside the lower surface of the side member 14.

As illustrated in FIGS. 4 to 6, outside middle flanges 3420 are provided to project, outward in the vehicle width direction, from two positions on the outside side portion 3406 spaced from each other in the longitudinal direction of the vehicle 10, and a bolt through-hole is formed in a tip of each of the outside middle flanges 3420, and a nut 3420A is welded with its shaft center aligned with that of the bolt through-hole.

The outside attaching portion 2822 of the case 28 is overlaid from above on the outside middle flanges 3420, so as to be attached to the outside middle flanges 3420 with bolts 2D inserted through the bolt through-holes and screwed into the nuts 3420A.

Outside upper flanges 3422 are provided to project, outward in the vehicle width direction, from two positions on the outside side portion 3406 above the outside middle flanges 3420 and spaced from each other in the longitudinal direction of the vehicle 10, and a bolt through-hole is formed in a tip of each of these outside upper flanges 3422.

The upper outside bracket 38 includes a body plate portion 3802 extending in the longitudinal direction of the vehicle 10, an outside lower flange 3804 provided to project outward in the vehicle width direction from a lower position of the body plate portion 3802, and an outside upper flange 3806 provided to project outward in the vehicle width direction from an upper position of the body plate portion 3802.

Bolt through-holes are formed respectively in front and rear portions of the outside lower flange 3804 and the outside upper flange 3806, and a nut 3804A is welded on the outside lower flange 3804 with its shaft center aligned with that of the bolt through-hole.

The outside lower flange 3804 is overlaid on the two outside upper flanges 3422, so as to be fastened to the lower bracket 34 with a bolt 2E inserted through the bolt through-hole and screwed into the nut 3804A.

The outside upper flange 3806 is overlaid on the lower surface of the leg 30, so as to be attached via the leg 30 to the floor panel 18 with a bolt 2F inserted through the bolt through-hole and a bolt through-hole of the leg 30 and screwed into a nut 3002 welded inside on the lower surface of the leg 30.

Besides, front under cover attaching brackets 40 are provided to project downward respectively from the inside side portion 3404 and the outside side portion 3406 of the canister bracket 32, and rear under cover attaching brackets 4210 are provided to project backward of the vehicle respectively from the both sides in a rear portion of the bottom portion 3402.

A bolt through-hole is formed in each of the front under cover attaching brackets 40, and a nut 4002A is welded with its shaft center aligned with that of the bolt through-hole.

A clip through-hole is formed in each of the rear under cover attaching brackets 4210.

As illustrated in FIGS. 4 and 5, the under cover 42 includes a bottom surface 4202 covering a lower portion of the canister 26, a front surface 4204 rising from a front portion of the bottom surface 4202 for covering a front portion of the canister 26, and a pair of side surfaces 4206 respectively rising from the both ends in the vehicle width direction of the bottom surface 4202 to be connected to the front surface 4204.

Attaching portions are provided on the bottom surface 4202 in positions respectively corresponding to the front under cover attaching brackets 40 and the rear under cover attaching brackets 4210.

The attaching portions of the under cover 42 are overlaid from below respectively on the front under cover attaching brackets 40 and the rear under cover attaching brackets 4210.

Each of the front under cover attaching brackets 40 is fastened to the corresponding one of the attaching portions with a bolt 2G inserted through the bolt through-hole and screwed into the nut 4002A.

Besides, each of the rear under cover attaching brackets 4210 is fastened to the corresponding one of the attaching portions with a clip 2F inserted through the clip through-hole.

Since the under cover 42 is thus disposed, the canister 26 is positioned above the under cover 42, and the canister 26 is covered with the under cover 42 when seen from below the vehicle 10. In other words, the canister bracket 32 plays two roles in attaching the canister 26 to the body (the side member 14) and fixing the under cover 42 used for aerodynamic improvement.

As illustrated in FIG. 2, the canister 26 and the under cover 42 are positioned behind a wheel house 21 of the rear wheel 20, and the under cover 42 protects the canister 26 from a stone hit by the rear wheel 20, which is advantageous in improving the durability of the canister 26.

Besides, since the under cover 42 is provided, the air passing below the body 12 from the front side of the vehicle during the drive is let out backward, which is advantageous in suppressing air resistance of the body 12.

As illustrated in FIGS. 4 and 5, a connecting flange 44 extending forward of the vehicle 10 is provided to project from a front end portion of the bottom portion 3402 inside in the vehicle width direction, a bolt through-hole is formed in the connecting flange 44, and a nut 4402 is welded on the upper surface of the connecting flange 44 with its shaft center aligned with that of the bolt through-hole.

As illustrated in FIGS. 1 to 5, one end of each of the vapor pipe 46, the atmosphere communicating pipe 48 and the purge pipe 50 protrudes forward beyond the front surface 2804 of the case 28.

The vapor pipe 46 connects the fuel tank 22 and the canister 26 to each other, and introduces the fuel evaporation gas evaporating from the fuel held in the fuel tank 22 into the canister 26 to be adsorbed by the fuel adsorbent.

The atmosphere communicating pipe 48 introduces the outside air to the canister 26 when the adsorbed fuel evaporation gas is released, and is connected, in one end thereof, to the canister 26 with the other end exposed to the atmosphere to communicate with the atmosphere.

The air filter 52 is disposed in the atmosphere communicating pipe 48 so as to remove foreign substances contained in the outside air for preventing the foreign substances (such as dust and dirt present in the air, water and mud) from entering the canister 26.

The purge pipe 50 connects the canister 26 and an intake passage of the engine to each other, and supplies, for combustion, the fuel evaporation gas adsorbed by the fuel adsorbent together with the outside air introduced through the atmosphere communicating pipe 48.

In this manner, the fuel evaporation gas generated in the fuel tank 22 is adsorbed by the fuel adsorbent, and the fuel evaporation gas thus adsorbed by the fuel adsorbent is supplied to the engine, so that the fuel evaporation gas is prevented from being released to the atmosphere.

It is noted that the vapor pipe 46 and the purge pipe 50 are partially omitted in FIGS. 1 to 5.

The air filter 52 is disposed in front of the canister 26 and below the side member 14 via the air filter bracket 54. The air filter bracket 54 is made from a material having sufficient rigidity such as a metal or the like.

As illustrated in FIGS. 1, 4, 5 and 7, the air filter bracket 54 includes a flange 5402 attached to the lower surface of the side member 14 with a bolt 2H, a vertically extending portion 5404 vertically extending downward from an end of the flange 5402 extending from the attaching position of the bolt 2H inward in the vehicle width direction along the bottom surface of the side member 14, and a longitudinally extending portion 5406 extending backward of the vehicle from a lower portion of the vertically extending portion 5404, and for component replacement, the air filter bracket 54 is singly detachable.

Figure 7:
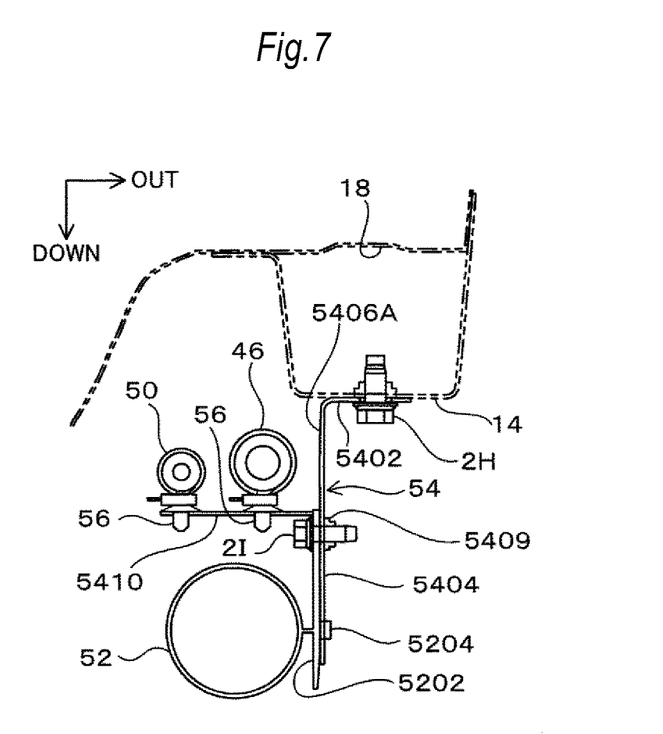
FIG. 7 is a cross-sectional view of a portion around an air filter taken on a plane passing along the vehicle width direction and the vehicle vertical direction.

As illustrated in FIG. 7, an air filter-side flange 5202 is overlaid on the vertically extending portion 5404, a boss 5204 of the air filter-side flange 5202 is inserted into a positioning hole of the vertically extending portion 5404, and a bolt 2I penetrates through the air filter-side flange 5202 and the vertically extending portion 5404, so that the air filter 52 can be attached to the inside, in the vehicle width direction, of the vertically extending portion 5404 with the bolt 2I and a nut 5409 screwed with the bolt 2I. Besides, a flange is formed by bending a vehicle front side end of the vertically extending portion 5404 outward in the vehicle width direction, that is, a direction opposing the air filter 52, so that damage risk of peripheral components in collision can be reduced, and that the rigidity of the air filter bracket 54 can be increased.

The longitudinally extending portion 5406 includes a vertical plate 5406A vertically extending and also longitudinally extending along the side member 14 of the body 10, and a lateral plate 5406B provided behind the vertical plate 5406A and extending in the vehicle width direction and also longitudinally extending along the side member 14 of the body 10, and the longitudinally extending portion 5406 attains sufficient rigidity owing to the vertical plate 5406A and the lateral plate 5406B provided in an orthogonal relationship.

A pipe attaching flange 5410 for attaching the purge pipe 50 and the vapor pipe 46 above the air filter 52 to be disposed side by side at a prescribed interval in the vehicle width direction is provided to project inward in the vehicle width direction on the vertical plate 5406A as illustrated in FIGS. 5 and 7. Since the air filter bracket 54 is thus provided with a fixing part for the purge pipe 50 and the vapor pipe 46 (i.e., the pipe attaching flange 5410), a risk of interference among components caused by assembly variation can be reduced.

Each of the purge pipe 50 and the vapor pipe 46 is supported, in a middle part thereof, on the pipe attaching flange 5410 through a clip 56, and owing to the longitudinally extending portion 5406 of the air filter bracket 54, a space for supporting the lengthwise middle of the purge pipe 50 and the lengthwise middle of the vapor pipe 46 is secured above the air filter 52, and the structure for supporting the purge pipe 50 and the vapor pipe 46 is simplified.

A bolt through-hole is formed in a rear portion of the lateral plate 5406B.

As illustrated in FIGS. 1, 4 and 5, the rear portion of the lateral plate 5406B is overlaid on the lower surface of the connecting flange 44 of the canister bracket 32, so as to be removably connected to the connecting flange 44 with a bolt 2J inserted through the bolt through-hole of the lateral plate 5406B and the bolt through-hole of the connecting flange 44 and screwed into the nut 4402.

In this manner, the air filter bracket 54 attached to the lower surface of the side member 14 with the bolt is connected to the canister bracket 32, so that the air filter bracket 54 can be integrated with the canister bracket 32.

The canister 26 has a larger weight than the air filter 52, and hence the canister bracket 32 is formed to be stronger than the air filter bracket 54. Therefore, in a portion below and away from the side member 14, the air filter bracket 54 is integrated with the canister bracket 32, so that the rigidity of the air filter bracket 54 can be increased, which is advantageous in firmly supporting the air filter bracket 54. Besides, owing to the connection between these brackets, the fixation on the side member 14, namely, the fixation on a skeleton member, can be elongated in the vehicle longitudinal direction, and therefore, the durability strength against input in the vehicle longitudinal direction can be improved.

Furthermore, owing to the longitudinally extending portion 5406, the air filter 52, the air filter bracket 54, the atmosphere communicating pipe 48, the purge pipe 50 and the vapor pipe 46 can be easily attached to and detached from the canister 26 without removing the canister 26 or the canister bracket 32 from the side member 14, which is advantageous in simply performing maintenance of the canister 26.

Incidentally, the longitudinally extending portion 5406 may be provided on the canister bracket 32 instead of the air filter bracket 54, or may be provided on both the air filter bracket 54 and the canister bracket 32 with ends of the longitudinally extending portions removably connected to each other.

As illustrated in FIGS. 1 to 3, an upstream portion 48A of the atmosphere communicating pipe 48 upstream from the air filter 52 extends from the air filter 52 toward a front of the vehicle 10, and an end 4802 of the atmosphere communicating pipe 48 is disposed in the center in the vehicle width direction of the cross member 16A.

More specifically, in the present embodiment, the cross member 16A has a closed cross-sectional structure connected to the floor panel 18 as illustrated in FIG. 3. Since a bottom wall 1602 of the cross member 16A is formed with a through hole 161 for water drainage which has a few centimeters in diameter, the inside of the closed cross-sectional structure is communicated to the atmosphere. The end 4802 of the atmosphere communicating pipe 48 penetrates through the bottom wall 1602 of the cross member 16A to extend upward through the bottom wall 1602, and the end 4802 of the atmosphere communicating pipe 48 is disposed inside the closed cross-sectional structure above the bottom wall 1602.

Besides, the upstream portion 48A disposed upstream from the air filter 52 is disposed to extend along the circumferential wall 2404 of the spare tire storage 24 projecting downward from the floor panel 18.

In the present embodiment, as illustrated in FIGS. 1 and 2, the upstream portion 48A of the atmosphere communicating pipe 48 is provided with three bent portions 4810, 4812 and 4814, so that the upstream portion 48A can extend along the circumferential wall 2404 owing to these bent portions 4810, 4812 and 4814.

According to the present embodiment, the canister 26 is attached to the vehicle 10 via the side member 14 extending in the longitudinal direction of the vehicle 10, and the end 4802 of the atmosphere communicating pipe 48 is disposed in the center in the vehicle width direction of the cross member 16A extending in the vehicle width direction.

Therefore, the canister 26 is attached to a portion with high rigidity, which is advantageous in firmly supporting the canister 26, and is advantageous in improving the durability of the canister 26.

Besides, since the end 4802 of the atmosphere communicating pipe 48 is positioned in the center in the vehicle width direction of the cross member 16A, it is away from an opening of the skeleton member such as a connecting portion between the side member 14 and the cross member 16A, which is advantageous in preventing water and mud from entering the atmosphere communicating pipe 48. In addition, the end 4802 of the atmosphere communicating pipe 48 is sufficiently away from the side members 14 on the both sides of the vehicle, which is advantageous in inhibiting the odor of the fuel from entering the vehicle cabin through the pair of side members 14 extending in the vehicle longitudinal direction.

Furthermore, the end 4802 of the atmosphere communicating pipe 48 is inserted through the bottom wall 1602 of the cross member 16A within the closed cross-sectional structure, and is opened in a position above the bottom wall 1602 with a sufficient height secured, which is more advantageous in preventing water or mud flowing through the cross member 16A from entering the atmosphere communicating pipe 48.

Besides, the canister 26 and the air filter 52 are disposed on the outside in the vehicle width direction of the spare tire storage 24, and the atmosphere communicating pipe 48 is disposed to extend along the outer circumference of the spare tire storage 24.

Therefore, at the time of rear end collision, the atmosphere communicating pipe 48 extending from the air filter 52 toward the end 4802 is pressed not locally but wholly with the bent surface of the circumferential wall 2404 of the spare tire storage 24, and the atmosphere communicating pipe 48 is easily deformed by the bent portions 4810, 4812 and 4814 but is difficult to buckle, which is advantageous in improving the durability of the atmosphere communicating pipe 48.

According to an aspect of the invention, there is provided a fuel vapor recovering structure for a vehicle, the vehicle having a side member extending in a longitudinal direction of the vehicle, and a cross member extending along a vehicle width direction, the fuel vapor recovering structure comprising: a canister attached to the side member for absorbing a fuel evaporation gas in a fuel tank of the vehicle; and an atmosphere communicating pipe having a first end connected to the canister, and a second end opened to the atmosphere and inserted in the cross member.

According to the above structure, the canister is attached to the vehicle via the side member and the end of the atmosphere communicating pipe is inserted in the cross member. Accordingly, the canister is attached to a portion with high rigidity, which is advantageous in firmly supporting the canister and improving the durability of the canister.

Besides, the end of the atmosphere communicating pipe is inserted in the cross member, which is advantageous in preventing water and mud from entering the atmosphere communicating pipe and inhibiting odor of a fuel from entering a vehicle cabin.

The fuel vapor recovering structure may further comprise an air filter for filtering air passing through the atmosphere communicating pipe, the canister may be attached to the side member via a canister bracket, the air filter may be attached to the side member via an air filter bracket, and the canister bracket and the air filter bracket may be detachably connected to each other below the side member.

In this case, the rigidity of the air filter bracket is improved, which is advantageous in firmly supporting the air filter bracket.

One of the canister bracket and the air filter bracket may have a longitudinally extending portion extending in the longitudinal direction below the side member, and the canister bracket and the air filter bracket may be detachably connected to each other by the longitudinally extending portion.

In this case, the atmosphere communicating pipe can be easily attached to and detached from the canister, which is advantageous in easily performing maintenance of the canister.

The fuel vapor recovering structure may further comprise: a vapor pipe configured to introduce the fuel evaporation gas in the fuel tank; and a purge pipe configured to supply, together with outside air, the fuel evaporation gas adsorbed by the canister to an engine of the vehicle, and the vapor pipe and the purge pipe may be supported side by side by the longitudinally extending portion.

In this case, a space for supporting a lengthwise middle of the purge pipe and a lengthwise middle of the vapor pipe is advantageously secured to simplify a structure for supporting these pipes, and a risk of interference among components caused by assembly variation can be reduced.

The canister may be disposed behind a rear wheel of the vehicle, and the canister bracket may be provided with an under cover covering a lower portion of the canister.

In this case, the canister is protected by the under cover from a stone hit by the rear wheel, and in addition, the air passing below a body of the vehicle is let out backward, which is advantageous in suppressing air resistance of the body.

The canister may be disposed in an outside in the vehicle width direction of a spare tire storage projecting downward from a floor panel of the vehicle, and the atmosphere communicating pipe may extend from the canister along an outer circumference of the spare tire storage toward a front of the vehicle.

In this case, at the time of rear end collision, the atmosphere communicating pipe is pressed not locally but wholly with a surface of the spare tire storage, and the atmosphere communicating pipe is difficult to buckle, which is advantageous in improving the durability of the atmosphere communicating pipe.

An opening of the second end of the atmosphere communicating pipe may be opened above a bottom surface of the cross member.

In this case, water and mud are more advantageously prevented from entering the atmosphere communicating pipe.

What is claimed is:
1. A fuel vapor recovering structure for a vehicle, the vehicle having a side member extending in a longitudinal direction of the vehicle, and a cross member extending along a vehicle width direction, the fuel vapor recovering structure comprising:
  a canister that absorbs a fuel evaporation gas in a fuel tank of the vehicle;
  a canister bracket that attaches the canister to the side member;
  an atmosphere communicating pipe having a first end connected to the canister, and a second end opened to the atmosphere;
  an air filter filtering air passing through the atmosphere communicating pipe; and
  an air filter bracket the attaches the air filter to the side member,
  wherein the air filter bracket is connected to the canister bracket.

2. The fuel vapor recovering structure according to claim 1,
  wherein the canister bracket and the air filter bracket are detachably connected to each other below the side member.

3. The fuel vapor recovering structure according to claim 2,
  wherein one of the canister bracket and the air filter bracket has a longitudinally extending portion extending in the longitudinal direction below the side member, and
  the canister bracket and the air filter bracket are detachably connected to each other by the longitudinally extending portion.

4. The fuel vapor recovering structure according to claim 3 further comprising:
  a vapor pipe configured to introduce the fuel evaporation gas in the fuel tank; and a purge pipe configured to supply, together with outside air, the fuel evaporation gas adsorbed by the canister to an engine of the vehicle,
  wherein the vapor pipe and the purge pipe are supported side by side by the longitudinally extending portion.

5. The fuel vapor recovering structure according to claim 2,
  wherein the canister is disposed behind a rear wheel of the vehicle, and
  the canister bracket is provided with an under cover covering a lower portion of the canister.

6. The fuel vapor recovering structure according to claim 5,
  wherein the canister is disposed in an outside in the vehicle width direction of a spare tire storage projecting downward from a floor panel of the vehicle, and
  the atmosphere communicating pipe extends from the canister along an outer circumference of the spare tire storage toward a front of the vehicle.

7. The fuel vapor recovering structure according to claim 1,
  wherein an opening of the second end of the atmosphere communicating pipe is opened above a bottom wall of the cross member.

8. The fuel vapor recovering structure according to claim 1,
  wherein the atmosphere communicating pipe is inserted in the cross member at a center of the cross member with respect to a lateral direction of the vehicle.

9. The fuel vapor recovering structure according to claim 1,
  wherein the second end of the atmosphere communication pipe is inserted in the cross member through a bottom wall of the cross member.

* * * * *